United States Patent [19]

Niemi et al.

[11] 3,980,820
[45] Sept. 14, 1976

[54] CLOCK PHASING CIRCUIT

[75] Inventors: Bill H. Niemi, Brooklyn Park; Mark D. Ryan, Fridley; George W. Miller, Anoka, all of Minn.

[73] Assignee: FMC Corporation, San Jose, Calif.

[22] Filed: June 17, 1975

[21] Appl. No.: 587,778

[52] U.S. Cl. .................. 178/69.5 R; 179/15 BS; 325/321; 328/63; 328/155
[51] Int. Cl.² .......................................... H04L 7/00
[58] Field of Search ............... 178/69.5 R, 69.5 DC; 179/15 BS; 340/146.1 D; 235/153 AE; 325/321; 328/155, 63

[56] References Cited
UNITED STATES PATENTS

| | | | |
|---|---|---|---|
| 3,188,569 | 6/1965 | Mahony | 178/69.5 R |
| 3,593,160 | 7/1971 | Moore | 328/155 |
| 3,725,590 | 4/1973 | Verstegen | 179/15 BS |
| 3,808,368 | 4/1974 | Pitroda et al. | 179/15 BS |
| 3,825,683 | 7/1974 | Pitroda et al. | 179/15 BS |
| 3,829,843 | 8/1974 | Cichetti, Jr. et al. | 179/15 BS |
| 3,839,599 | 10/1974 | Pitroda | 325/321 |
| 3,894,246 | 7/1975 | Torgrim | 328/63 |

*Primary Examiner*—Thomas A. Robinson
*Attorney, Agent, or Firm*—R. S. Kelly; C. E. Tripp

[57] ABSTRACT

A clock phasing circuit for aligning data which is transmitted by a first clock, running at a particular frequency, with a second clock running at the same frequency as the first clock but in a different and undetermined phase relationship. The incoming data includes a synchronizing signal which initiates the operation of the clock phasing circuitry so that the data is alternately clocked into each of a pair of flip flops by successive pulses from the first clock. Each flip flop is individually connected to one of the inputs of one logic gate of a pair of gates which are alternately enabled by successive pulses from the second clock. The outputs from the two logic gates are combined by a further logic gate so that the data is reformed in alignment with the second clock.

11 Claims, 2 Drawing Figures

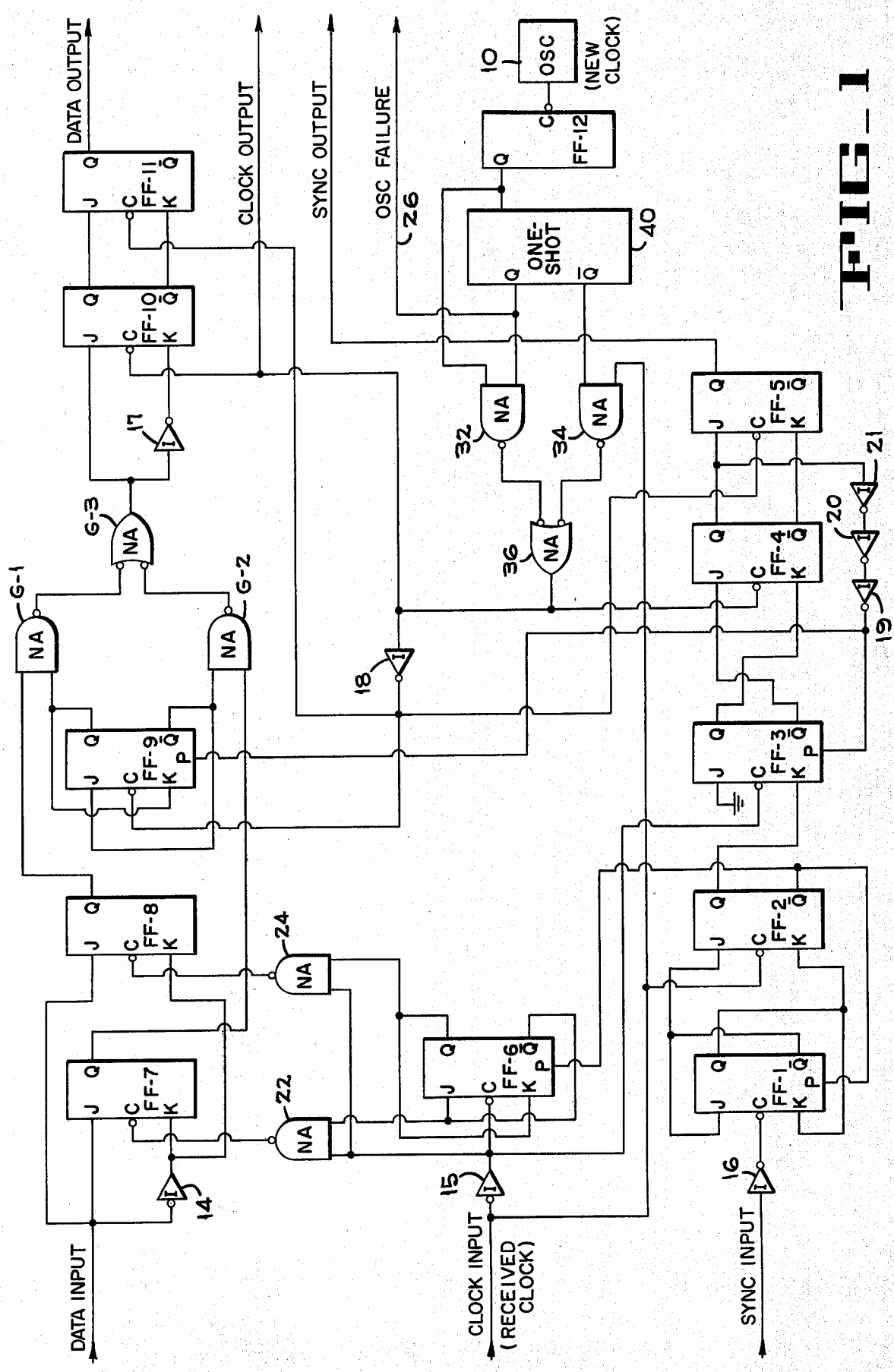
FIG_1

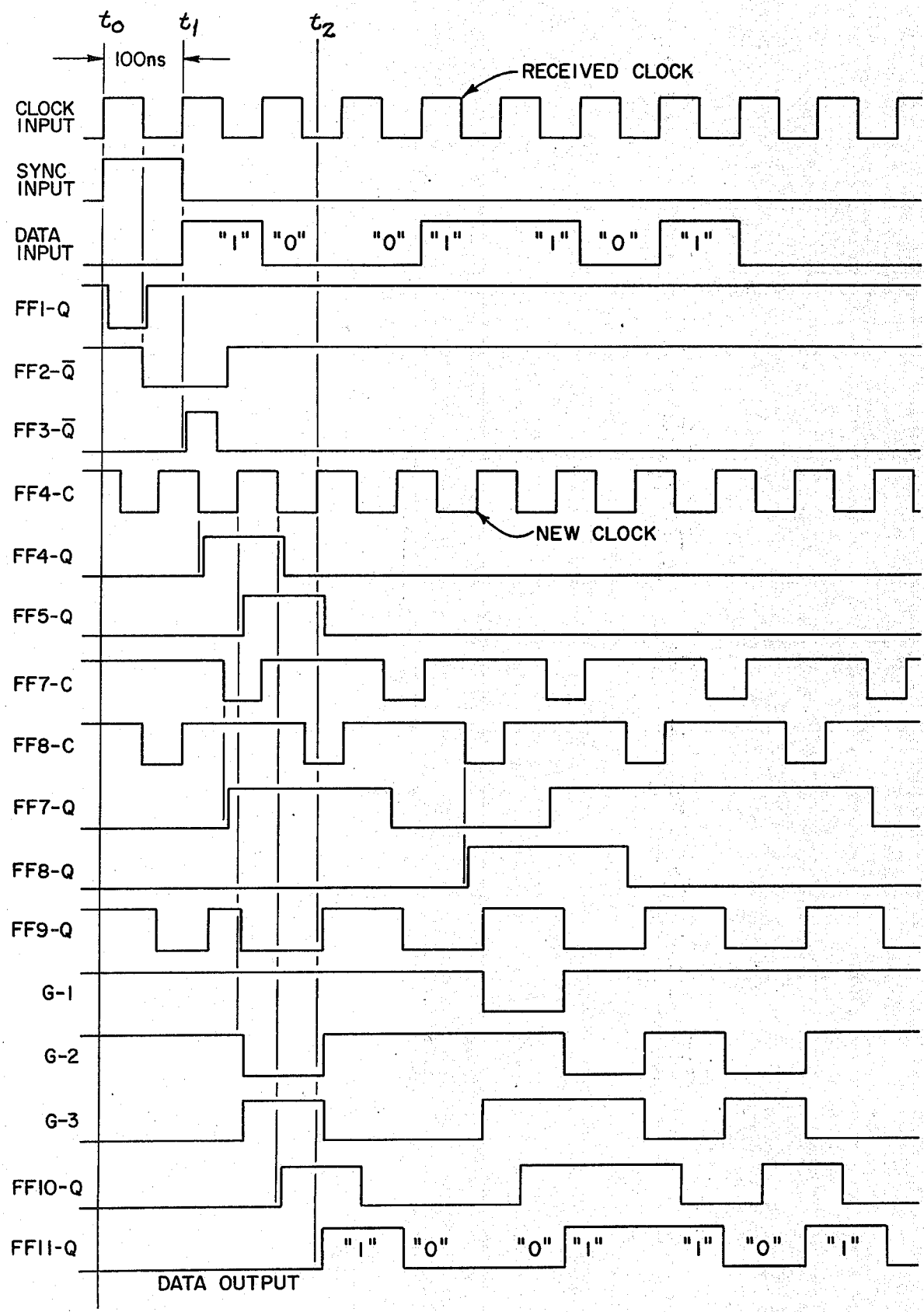

CLOCK PHASING CIRCUIT

BACKGROUND OF THE INVENTION

1. Field of the Invention

The present invention pertains to clock phasing or aligning circuits, and more particularly, it pertains to circuitry for aligning data transmitted at a first clock frequency with a second clock running at essentially the same frequency as said first clock but at a differing and undetermined phase relationship.

2. Description of the Prior Art

In data transmission systems it frequently becomes important to rephase data since the phase of a continuous string of data bits will be influenced by the bit pattern being transmitted. This influence is a result of the fact that different data pulse widths received on the transmission line may have slightly different phase shifts. If the clock is carried with the transmitted data — which is a common practice — the reformed clock can display a jitter, up to about 10 nanoseconds in some instances, when a varying bit pattern is being received. In a typical system where the data transmitted clock is repeatedly reformed between separate data links, the cumulative jitter on the clock output of the system can have serious effects on the integrity of the data. Thus, it is frequently desirable to shift the data at the end of each data link of a transmission system to a new clock running at generally the same frequency as the clock which shifts the received data to thereby provide a "clean" clock to shift the data over the next data link.

In prior art data handling systems wherein serial data is to be shifted between one clock and another clock, the problem is usually handled through the use of a memory or storage means, such as a shift register. Thus, the incoming data can be shifted into the storage means by the received clock and then shifted out of the storage register by the new clock. This is the conventional approach to the clock phasing problem, and it has a significant advantage in its simplicity. However, it also has some significant disadvantages. For example, such clock phasing circuitry generally requires a large storage capacity thereby increasing the required hardware. Secondly, there is inherently a transmission delay created by the necessity of storing the incoming data, and this may seriously affect the usability of the transmission system. Finally, the necessity for a fixed storage capacity places a limitation on the data capacity of the system since, as will be obvious, individual data words or bit groups which overrun the storage capacity could not be successfully handled by such systems.

If, on the other hand, one attempts to handle serial data bit-by-bit through a logic gate to rephase it with a new clock, any drift, i.e., minor differences in frequency, between the clock received with the incoming data and the new clock will affect the data integrity. Also, differences in phase production due to line dispersion in the incoming data will also affect the data integrity.

One other method which can be used in rephasing data is to directly drive the new clock with an external signal provided by the clock carried by the original data. Thus, a so-called phase locked loop system is formed wherein all of the data in the loop is synchronized to a common clock. In such a system, however, the second clock means must be an oscillator that can be synchronized to an external signal, and thus the second clock is, of necessity, one with a highly variable frequency shift which makes it inapplicable for use at higher frequencies. Thus, the phase locked loop system of providing synchronized data control is generally limited to operation at low frequencies where clock drift will not destroy the integrity of the data.

SUMMARY OF THE INVENTION

The present invention provides a clock phasing circuit which is operable at very high clock frequencies, (e.g., in the 10 megahertz range) and which is operable to phase shift data between a first clock and a second clock operating at generally the same frequency and with said second clock comprising, for example, a high precision crystal oscillator which cannot be readily driven into synchronism with an external signal. The circuitry of the present invention does not require the high bit capacity storage registers of the prior art, and yet it is able to handle undetermined line dispersions and minor amounts of drift between the two clock signals to accurately reproduce data in phase shifted form on the second clock.

The clock phasing circuitry of the present invention generally comprises a pair of single bit storage elements (e.g., flip-flop circuits) into which successive data bits are alternatively clocked by successive pulses from the received clock transmitted with or derived from the data. The data bits are transferred from the bit storage elements to a pair of separate logic gates, and these logic gates are alternately enabled by successive pulses from the new clock. The outputs of the two logic gates are directed to a third logic gate which combines the individual bits back into a single continuous data train which directly corresponds with the incoming data train except that it has been shifted to the phase of the new clock.

The clock phasing circuitry of the present invention uses a minimum number of circuit elements to provide the requisite phase shifting and, most importantly, provides a minimum delay in the data transmission since it does not require the shifting of an entire train of data bits into a storage register. The clock phasing circuitry of the present invention, in its preferred form, has a further advantage in that it readily permits data to be alternatively retransmitted in phase with the received clock if for some reason the second clock cannot be utilized.

BRIEF DESCRIPTION OF THE DRAWINGS

FIG. 1 is an electric schematic diagram of the clock phasing circuitry of the present invention.

FIG. 2 is a timing diagram illustrating the signal wave shapes at various points in the circuitry of FIG. 1.

DESCRIPTION OF THE PREFERRED EMBODIMENT

Referring now more particularly to the drawings, FIG. 1 shows an electrical schematic diagram of the clock phasing circuitry of the present invention including three inputs labeled (1) data input, (2) clock input, and (3) sync input. While the circuitry of the present invention is adapted to accept each of these separate signals on separate lines, it will be recognized that in normal serial data transmission all of such signals can be combined on a single line and that the separate signals can then be sorted out by conventional means. For example, the clock can be reformed from the data itself, and the sync signals, which usually frame the data words, can be separated from the data words and placed on an alternate line. As shown in the timing diagram of FIG. 2, the clock input signal and the sync input signal are provided with their rising edges in phase at a time $t_o$. For the purposes of illustration, the clock frequencies are taken to be 10 megahertz with each clock cycle thus having a period of 100 nanoseconds. The sync input signal is arranged to occur for one clock cycle (100 ns) wherein it is immediately followed by the rising edge of the first data bit at a time $t_1$ (FIG. 2). The data train is shown as being comprised of the bit sequence 1-0-0-1-1-0-1 which is shifted to the phase of the new clock — as shown in FIG. 2 at the clock input to a flip-flop FF-4 (i.e., FF4-C).

The clock aligning circuitry of the present invention is initiated by the rising edge of the sync input signal which is directed through an inverter 16 to the clock input of a flip-flop FF-1. The rising edge of the sync signal thus initiates the operation of the clock phasing circuitry, and it will be appreciated that the width of the sync pulse is really immaterial. Flip-flop FF-1 has been previously preset by flip-flop FF-2 on the previous data transmission such that when the leading edge of the new sync pulse clocks flip-flop FF-1, the Q output goes low and the $\overline{Q}$ output goes high to set the K–J inputs, respectively, of a second flip-flop FF-2. On the succeeding phase of the clock the Q output of FF-2 goes high and the $\overline{Q}$ output goes low to preset flip-flop FF-1 and also to preset a flip-flop FF-6 which receives the clock input pulses through an inverter 15. The flip-flop FF-6 at this time is set so that on the next succeeding phase of the clock input, i.e., at time $t_1$ (plus element delay times) and at the start of the data pattern, flip-flop FF-6 provides an enabling pulse to a NAND gate 22 and alternately provides enabling clock pulses to NAND gates 22 and 24 thereafter to alternately clock a pair of conventional J–K flip-flops FF-7 and FF-8.

As shown in FIG. 1, the J inputs of both of flip-flops FF-7 and FF-8 are tied to the data input line with the complement of the data input being provided by an inverter 14 at the K inputs to the flip-flops FF-7 and FF-8. The gates 22 and 24, which provide an "anding" function, are arranged so that they are alternately enabled at the mid-point of the received clock cycle, i.e., when the clock goes low. The presetting of flip-flop FF-6 by flip-flop FF-2 will be seen to insure that the first bit in the data train will be strobed at the center of the data bit and transferred to the output of flip-flop FF-7; that is to say, the $\overline{Q}$ output of flip-flop FF-6 will go high at $t_1$ and the output of inverter 15 will go high one-half clock cycle (50 ns) after $t_1$ to enable gate 22. On the succeeding clock cycle, i.e., 100 ns after $t_1$, gate 24 will be enabled as the Q output of FF-6 goes high so that the second bit in the data train will be transferred through flip-flop FF-8. Then, on the succeeding clock cycle, gate 22 will be again enabled so that the third data bit will be clocked through FF-7 and so forth with each of the data bits being thereafter alternately clocked through flip-flop FF-7 or flip-flop FF-8, i.e., the odd-numbered data bits through FF-7 and the even-numbered bits through FF-8.

The Q outputs of the flip-flops FF-7 and FF-8 are directed to a pair of NAND gates G-2 and G-1 respectively. These gates are arranged to be alternately enabled by a flip-flop FF-9 which is clocked by the new clock as provided by a local oscillator 10 as shown. The oscillator 10 is divided down through a flip-flop FF-12 to the desired 10 megahertz signal which is then directed to a conventional one-shot or retriggerable delay circuit 40, the output of which is directed to a NAND gate 32 with the complement of the output being directed to an alternate NAND gate 34. The pulse width of the one-shot circuit is considerably longer than the clock pulse time so that gate 32 will remain enabled and gate 34 will remain disabled so long as the oscillator 10 continues to provide a pulse train. As shown in FIG. 1, a separate line 26 from the output of the one-shot 40 can be provided so as to locally indicate the failure of the oscillator 10 when the signal on such line goes low. The outputs of both of the gates 32 and 34 are connected to a NAND gate 36 with the output of gate 36 thereby providing the new clock signal. It will be seen that one of inputs to gate 34 is the pulse train from the received clock. Consequently, if the pulse train from oscillator 10 should stop, the gate 32 will be disabled and the gate 34 will be enabled (by one-shot 40), and the received clock input signal will be directed through gate 34 so that the clock pulse train on the output of gate 36 will continue with the data clock being substituted for the new clock.

The new clock signal from gate 36 is directed through an inverter 18 to the clock input of the flip-flop FF-9 which, as previously pointed out, is operative to transfer the data bits through the gates G-1 and G-2. The flip-flop FF-9 is arranged to be preset in the proper state at the start of the data receiving cycle so that the first data bit from flip-flop FF-7 of the data will be directed through gate G-2. Thus, the $\overline{Q}$ output of FF-9 will go high and the Q output will go low at some time during the 50 ns period following the setting of flip-flop FF-7 with the first data bit information depending upon the phase of the new clock with respect to the received data clock. This transfers the data bit through gate G-2 and through a NAND gate G-3 which is wired so as to provide an "or" function with the signal outputs from gates G-1 and G-2. The output of gate G3 is directed to the J–K inputs of a flip-flop FF-10. On the next succeeding new clock pulse, flip-flop FF-9 operates to transfer the second data bit information through gates G-1 and G-3, and on the following successive new clock pulses the flip-flop FF-9 will alternately clock the odd and even data bit information through the gates G-2 and G-1 respectively. As can be seen, if the data bit is a 1 the gates G-1 or G-2 will provide a low output whereas if the data bit is a "zero" the gates G-1 or G-2 will provide a high output. Thus, only a data bit in the 1 state will create a signal pulse from the gates G-1 and G-2.

The presetting of flip-flop FF-9 is provided by a pair of flip-flops FF-3 and FF-4 which are serially connected to the output of FF-2. A series of inverters 19, 20 and 21 are provided in an output line from FF-4 to the preset input of FF-3 in order to provide the requisite delay so that an output pulse of sufficient width is produced by FF-3 before it is reset despite the relative phase of the new clock which clocks the flip-flop FF-4. A separate flip-flop FF-5 is connected to the output of FF-4 so as to provide a sync output signal in alignment with the new clock.

The outputs of gates G-1 and G-2 are directed to the NAND gate G-3 which thereby functions to recombine the data which is directed to the J–K inputs of flip-flop FF-10. An inverter 17 is used to provide the complement for the G-3 output. The output of flip-flop FF-10 is directed through a further flip-flop FF-11 to maintain the right clock phase on the data output signal whereby the data, clock and sync input signals are provided on three separate output lines exactly repeating the input information but with the clock being rephased. It will be noted that the use of an inverter 18 on the clock input to the flip-flop FF-9 causes the FF-9 to be clocked a half-cycle prior to the clocking of flip-flop FF-10. This 50 nanosecond delay in the clocking of flip-flop FF-9 and FF-10 sets the minimum permissible drift which can occur between the input and output clocks during any data receiving cycle, i.e., between sync pulses. Since the timing of flip-flop FF-9 is controlled by the new clock and since the timing of the data bit pulses to the gates G-1 and G-2 is controlled by the received clock, these signals may come at varying relative times although for the initial data bit the gate G-2 will be provided with the data signal before (up to 50 nanoseconds before) the enabling signal from FF-9. In the worst case — where the data signal and the enabling signal from FF-9 arrive substantially simultaneously initially and where the new clock is running slightly faster than the received clock — it will be recognized that a maximum of 50 nanoseconds drift between the clocks can be tolerated before the clocking of FF-10 transfers out the wrong data to the output line. in all other cases a greater amount of relative drift is permissible. Even with 50 nanoseconds of drift, however, a minimum of 5000 bits can be transmitted between sync pulses, and this will accommodate almost all normal data transmission systems.

As shown in FIG. 2, the data output and data input are identical except that the data has been shifted in time from a time $t_1$ to a time $t_2$. This phase shift (of less than two clock cycles) is not so much that it cannot be tolerated in normal data handling systems.

From the foregoing description it will be seen that the clock phasing circuitry of the present invention comprises a simplified circuit which can handle serial digital data and rephase the clock carried with such data to take all jitter and line dispersion out so as to provide a clean clock and data track for succeeding data links. A minimum amount of time is lost in the rephasing cycle since registers capable of storing an entire data word are not needed.

Although the best mode contemplated for carrying out the present invention has been herein shown and described, it will be apparent that modification and variation may be made without departing from what is regarded to be the subject matter of the invention.

What is claimed is:

1. A clock phasing circuit for aligning serial digital data which is transmitted by a first clock running at a particular frequency with a second clock running at essentially the same frequency as the first clock but having a time varying phase relationship, said circuit comprising a plurality of bit storage elements for sequentially storing the data bits transmitted by said first clock, a plurality of first logic gates with each of said gates having an input connected to receive the output of a respective one of said bit storage elements, a second logic gate having its inputs connected to the outputs of each of said first logic gates, and means connected to said second clock for controlling the operation of said first logic gates so that said data bits are transferred through said second logic gate in the proper sequence whereby said data is reformed in phase shifted relationship.

2. A clock phasing circuit according to claim 1 including means for detecting a synchronizing bit which precedes said data bits in the data transmitted by said first clock, and means connected between said synchronizing bit detecting means and said means for controlling the operation of said first logic gates for initiating the transfer of data bits through said second logic gate in a predetermined manner.

3. A clock phasing circuit according to claim 1 including an output bit storage element connected to the output of said second logic gate, and means controlling the transfer of said data through said output bit storage element, at transfer times different from those times when said data bits are transferred through said second logic gate.

4. A clock phasing circuit according to claim 3 wherein said second clock is arranged to produce a pair of pulse trains 180° out of phase with each other, one of said pulse trains of the second clock being utilized by said means for controlling the transfer for data through said output bit storage element and the other of said pulse trains of the second clock being utilized by said means for controlling the operation of said first logic gates.

5. A clock phasing circuit according to claim 1 including means for switching said first clock to said means for controlling the operation of said first logic gates in the event of failure of said second clock.

6. A clock phasing circuit for aligning serial digital data which is transmitted by a first clock running at a particular frequency with a second clock running at essentially the same frequency as the first clock but having a time varying phase relationship, said circuit comprising first and second bit holding elements, means for alternately clocking said data bit by bit into said first and second bit holding elements upon successive pulses from said first clock, a first logic gate connected to the output of said first bit holding element and a second logic gate connected to the output of said second bit holding element, means controlled by said second clock for alternately enabling said first and second logic gates, and means connected to the outputs of said logic gates for combining the signals therefrom so that the data is reformed in alignment with said second clock.

7. A clock phasing circuit according to claim 6 including means for switching said first clock to said means for alternately enabling said first and second logic gates in the event of failure of said second clock.

8. A clock phasing circuit according to claim 6 wherein said means for combining the signals from said logic gates includes a third bit holding element, said second clock being arranged to produce a pair of pulse trains 180° out of phase with each other, one of said pulse trains of the second clock being connected to said means for alternately enabling said first and second logic gates and the other of said pulse trains of the second clock being connected to said third bit holding element.

9. A clock phasing circuit according to claim 6 wherein said means for clocking said data into said bit holding elements comprises a flip flop with its clock input connected to receive successive pulses from said first clock, and a pair of control gates connected to the outputs of said flip flop, said control gates being connected so as to alternately clock said first and second bit holding elements.

10. A clock phasing circuit according to claim 9 including means for detecting a synchronizing bit which precedes the data bits in the data transmitted by said first clock, and means connected between said synchronizing bit detecting means and said flip flop and between said synchronizing bit detecting means and said means for enabling said first and second logic gates for initiating the transfer of data bits into said bit holding elements and through said logic gates in a predetermined manner.

11. A clock phasing circuit for aligning serial digital data which is transmitted by a first clock running at a particular frequency with a second clock running at essentially the same frequency as the first clock but having a time varying phase relationship, said circuit comprising first and second bit holding elements, means for alternately clocking said data bit by bit into said first and second bit holding elements upon successive pulses from said first clock, said last named means being operative to maintain said data bits in said bit holding elements for time periods substantially longer than that of the original data bit periods, a first logic gate connected to the output of said first bit holding element and a second logic gate connected to the output of said second bit holding element, means controlled by said second clock for alternately enabling said first and second logic gates at the frequency of said second clock, a third logic gate connected to the outputs of said first and second logic gates, data transfer means connected to the output of said third logic gate to receive the combined data bit signals therefrom, and means for shifting said data bit signals through said data transfer means at said second clock frequency and 180° out of phase with the second clock signal provided by said means for alternately enabling said first and second logic gates whereby said data is reformed in alignment with said second clock.

\* \* \* \* \*

UNITED STATES PATENT OFFICE
CERTIFICATE OF CORRECTION

PATENT NO. : 3,980,820
DATED : September 14, 1976
INVENTOR(S) : BILL H. NIEMI ET AL It is certified that error appears in the above-identified patent and that said Letters Patent are hereby corrected as shown below:

Col. 2, line 26, change "alternatively" to --alternately--.

Col. 4, line 47, change 1 to -- "1"--;

line 50, change 1 to -- "1"--.

Col. 6, line 21, change "for" second occurrene to -- of --.

Signed and Sealed this

Fifteenth Day of February 1977

[SEAL]

Attest:

RUTH C. MASON
*Attesting Officer*

C. MARSHALL DANN
*Commissioner of Patents and Trademarks*